United States Patent

Goebelbecker et al.

[11] Patent Number: 5,596,029
[45] Date of Patent: *Jan. 21, 1997

[54] INTUMESCENT COMPOSITION OF THE TWO-COMPONENT TYPE

[75] Inventors: Sieghard Goebelbecker, Bodenheim; Hans-Dieter Naegerl, Dudenhofen, both of Germany; George J. Danker, Olathe, Kans.; Donald Kirk, Kansas City, Mo.

[73] Assignees: Akro-Fireguard Products, Inc., Lenexa, Kans.; Chemische Fabrik Budenheim Rudolf A. Oetker, Budenheim, Germany

[*] Notice: The term of this patent shall not extend beyond the expiration date of Pat. No. 5,387,655.

[21] Appl. No.: 207,050

[22] Filed: Mar. 8, 1994

[30] Foreign Application Priority Data

Mar. 9, 1993 [DE] Germany ............... 43 07 406.5

[51] Int. Cl.$^6$ ............... C09K 21/14; C08K 5/521
[52] U.S. Cl. ............... 523/179; 524/115; 524/140; 524/145; 524/147
[58] Field of Search ............... 523/179; 524/115, 524/140, 145, 147

[56] References Cited

U.S. PATENT DOCUMENTS

| | | | |
|---|---|---|---|
| 4,100,231 | 7/1978 | Tai et al. ............... | 260/978 |
| 4,176,115 | 11/1979 | Hartman et al. ............... | 523/179 |
| 4,370,442 | 1/1983 | Pearson ............... | 524/598 |
| 4,678,607 | 7/1987 | Reitz ............... | 523/179 |
| 4,774,268 | 9/1988 | Marx et al. ............... | 523/179 |
| 4,916,176 | 4/1990 | Vachlas et al. ............... | 524/140 |
| 5,369,160 | 11/1994 | Adyha et al. ............... | 524/140 |
| 5,387,655 | 2/1995 | Aslin ............... | 524/115 |

FOREIGN PATENT DOCUMENTS

| 561048 | 7/1958 | Canada ............... | 523/179 |
|---|---|---|---|

*Primary Examiner*—Paul R. Michl
*Assistant Examiner*—Olga Asinovsky
*Attorney, Agent, or Firm*—Oblon, Spivak, McClelland, Maier & Neustadt, P.C.

[57] ABSTRACT

This invention relates to an intumescent composition of the two-component type, comprising:
 (A) an amino-formaldehyde resin; and
 (B) an ester of phosphoric acid in admixture with an additive selected from the group consisting of a water scavenger, a filler, a pigment, a surfactant and a mixture thereof.

This composition is suitable for use as a fire protection agent, particularly for the coating or impregnation, respectively, of fiberglass mats.

4 Claims, No Drawings

INTUMESCENT COMPOSITION OF THE TWO-COMPONENT TYPE

TECHNICAL FIELD

The present invention relates to fire retardant materials, particularly intumescent compositions of the two-component type and their use in the manufacture of fire resistant coatings.

BACKGROUND ART

Intumescent compositions are generally known in the art; when exposed to heat and fire and upon swelling they form a thick, relatively non-flammable insulating carbonaceous skeleton. The essential active components of such compositions include a carbon source which ultimately forms the insulating carbonaceous skeleton, a spumescent which affects the thickness or the swelling of the products formed upon burning and an acid catalyst, such as an acidic phosphoric acid compound, which initiates the intumescence reaction when exposed to heat. In the past, intumescent compositions have been applied as surface paints or other coatings onto substrates to reduce the flammability of the substrate and protect the substrate from damage due to intensified heat and flames.

Conventional intumescent paints and coatings generally comprise dispersions of a carbon source, a spumescent and an acid catalyst in combination with binders, thickeners, solvents, pigments and the like. Such coatings have proven only marginally effective in protecting the underlying substrate from fire damage, however, because the dispersed active intumescent components are relatively far apart, in molecular terms, from one another within the composition. Thus, there is needed some time for the transport and the internal mixing of said essential components which delays the intumescent reaction and prevents the immediate protection of the substrate.

Integrated polymer compositions, wherein all of the components needed for intumescence are provided within the polymer chain, have more recently been developed in the art. These compositions have proven more effective than the intumescent coatings described above, probably because the components necessary for intumescence are closely held together in the polymer chain and thus a short or no transport time at all is required for the initiation of the intumescence process.

As these polymer formulations offer the potential for added protection there is a need to further improve them and to provide methods of producing the same for effective use in a variety of industrial and commercial applications and to enable easy on-site application of the same.

Of particular interest are intumescent coatings which have been proposed and used as protective coatings for structural elements which separate compartments to prevent the passage of fire from one compartment to an adjacent one. Many fire walls or barriers previously used in construction, however, were either not treated with a protective intumescent coating, because such coatings were not known at the time of the construction, or were treated with inferior dispersion-type coatings that have lost effectiveness over time and weathering. Because of the restricted space in which such barriers are generally located, it is often difficult and expensive to replace such structural elements with newly coated barriers.

Thus, there is a need for effective intumescent coating compositions that can be easily applied to permanently affixed barriers, on-site and in a relatively short period of time. In addition, the resulting coating preferably should not release noxious fumes or otherwise require the use of dangerous solvents during application, since the barriers requiring coating are frequently in relatively compact and unventilated areas. A further preferred property of such a coating would be an absence of noxious or toxic fumes created upon undergoing the intumescence process, as such fumes are dangerous to persons in the vicinity of the fire.

DISCLOSURE OF INVENTION

In view of the foregoing, it is an object of the present invention to provide an intumescent composition which acts intrinsically intumescent, in that all of the components necessary for effecting intumescence are provided in close molecular contact.

Yet another object of the present invention is to provide an intumescent composition that is useful as a coating composition for reducing the flammability of the underlying substrate.

Another object of the present invention is to provide an intumescent composition in the form of an aqueous formulation to facilitate its use and to reduce fire and health hazards during application.

Still another object of the present invention is to provide an intumescent composition which does not produce harmful or flammable gases during intumescence.

A further object of the present invention is to provide an intumescent composition having a viscosity and other characteristics at least roughly similar to standard coating compositions so that it may be readily applied as a coating using standard equipment and methods and with little or no specialized training.

Another object of the present invention is to provide an intumescent composition which is resistant to physical, chemical and environmental degradation over time.

Yet another object of the present invention is to provide an intumescent composition which cures relatively quickly and particularly at relatively low temperatures which may be found on-site and in practice, respectively.

A further object of the present invention is to provide an intumescent composition in the form of two components having a relatively long shelf life prior to mixing and application, it being possible to combine said components on-site and the actual intumescent substance being then formed as reaction product from the mixture.

According to the present invention the above objects are achieved by an intumescent composition of the two-component type which is characterized in that it comprises at least:

(A) amino-formaldehyde resin;
(B) ester of phosphoric acid (in the following also referred to as phosphate ester) in admixture with at least one additive selected from one or more water scavengers, fillers, pigments, surfactants and mixtures thereof.

DETAILED DESCRIPTION

Preferably, the above components (A) and (B) are packaged separately. In that case both components show a relatively high storage stability and may be mixed together at the site of application to form the actual intumescent coating composition. According to the present invention it has been found that providing components (A) and (B) separately and mixing the ester of phosphoric acid with one of the above additives, particularly a water scavenger, significantly increases the shelf life of the above components which in turn greatly increases the commercial acceptability of the intumescent composition.

Upon mixing of the two components (A) and (B) the amino-formaldehyde resin and the phosphate ester react through a condensation reaction (under formation of water) to form a polymer which contains all components necessary for an intumescence within its chain structure. Upon application as surface coating or the like, the composition cures to form a relatively uniform, crosslinked, flexible and impermeable intumescent layer. The water scavenger, preferably fumed silica, enhances or promotes dehydration or evaporation of the water from the composition, such that moisture is not trapped under the (cured) surface layer which would cause weaknesses and cavities within the overall coating. Since water is the principal reaction by-product, there are no toxic or flammable fumes produced while the composition cures, making the composition according to the present invention particularly suitable for use in closed systems (rooms) such as aircraft or in submarines.

The present intumescent composition is an improvement of the intumescent composition disclosed in PCT application WO 93/05118. Said PCT application describes a composition having integrated intumescent properties and obtainable by combining (a) one or more amino-formaldehyde resins; and (b) a mixture of mono- and diesters of orthophosphoric acid with one or more polyols, optionally modified with carboxylic acid anhydride, the average hydroxyl group content of said polyols being at least 40% by weight, the molar ratio monoester/diester not exceeding 12:1 and the phosphorus content of the mixture being at least 10% by weight.

All of the components of the intumescent composition described in the above PCT application may also be employed according to the present invention. Particularly, according to the present invention it is preferred to employ the mixture of mono- and diesters of orthophosphoric acid with one or more polyols described in the above PCT application as phosphate ester of present component (B). Such a mixture is commercially available, for example under the tradename BUDIT® 380 (product No. Fb 05-80) from Chemische Fabrik Budenheim.

As water scavengers in component (B) any known compounds may be employed, but the use of highly particulate materials, such as fumed silica, is preferred. It has been found that the use of fumed silica also entails the advantage of increasing, due to its thixotropic nature, the viscosity of the composition. This makes it possible for the viscosity of component (B) (and thus of the whole composition) to be in the range of the viscosities of conventional coating formulations which in turn makes it possible to apply said material by means of standard methods and equipment. Furthermore, the fumed silica shows positive effects on the mechanical strength and flexibility of the coating. A particularly preferred commerically available type of fumed silica is available from the company DEGUSSA under the tradename Aerosil® 200.

Furthermore, component (B) of the composition according to the present invention may comprise, instead of or (preferably) in addition to the water scavenger, surfactants, fillers and pigments. Said additives are conventional materials which conventionally find use in intumescent compositions. Thus titania, carbon black and silicate pigments may, for example, be used as pigments. Fillers such as mineral or cellulose fibers are particularly suitable for increasing the mechanical strength of the cured coating. The use of surfactants and the type of surfactants to be employed depend on, i.a., the substrate to be coated. Conventional anionic, cationic and non-ionic surfactants known to the skilled person may be employed. For example, the use of a white colored paste containing 65% of titania and 35% of surfactant has proven to be particularly suitable for the coating of fiberglass mats or panels. Said product is available under the designation Colortrend® Titanweiβ, e.g., from Hüls America, Inc., Piscataway, N.J., USA. Said product prevents the formation of craters and bubbles within the coating. The resulting white color of the coating also makes it easier to see which areas of the substrate have already been coated. Thus the color contributes to the achievement of a uniform layer thickness over the entire area to be coated at least indirectly.

The phosphate ester containing component (B) is preferably formulated as aqueous solution or dispersion, respectively, it being possible to adjust the water concentration to the viscosity desired for a particular application. Generally, component (B) contains the phosphate ester in an amount of from 30 to 70% by weight, preferably about 50% by weight; a water scavenger in an amount of from 0.5 to 10% by weight, particularly from 0.75 to 3% by weight; and water in an amount of from 0 to 45% by weight, particularly from 15 to 25% by weight. The above percentages are based on the weight of the not yet cured coating composition. The possible remainder to 100% is composed of the other additives. It is to be noted that the amount of water employed affects the time required for curing in that a higher water content increases the curing time. Thus, the amount of water to be employed has to be optimized with respect to the viscosity desired for the application such that a thin coating can be produced by spraying, brushing or any other conventional coating method.

The amino-formaldehyde component (A) of the composition according to the present invention is preferably employed in an amount of from 70 to 30% by weight, particularly preferred from 40 to 20% by weight, based on the not yet cured coating composition. The amino-formaldehyde resins useful for the composition according to the present invention must be capable of reacting with the ester of phosphoric acid of component (B) by a condensation reaction to form a crosslinked intumescent polymer. Preferred amino-formaldehyde resins for said reaction are melamine-formaldehyde resins, urea-formaldehyde resins and mixtures thereof.

As described in the above PCT application, said amino-formaldehyde resins may be modified to increase the stability of the resulting coating, for example by methylation or by reaction with aromatic glycidyl ethers and/or cycloaliphatic epoxides. Such additives also increase the adhesion of the intumescent layer to the substrate to be protected in the case of fire. For the purposes of the present invention particularly suitable are dimethylol-melamine resins and trimethylol-melamine resins, and particularly hexamethoxymethyl-melamine resins. The products employed in practice usually contain mixtures of methylolated melamines. Such mixtures are suitable as well. The commercially available products are either spray-dried powders, aqueous solutions or liquid formulations having a solids content of close to 100%.

Since the presence of water adversely affects the shelf life of the amino-formaldehyde resin (melamine resin) and thus that of the two-component system, liquid amino-formaldehyde resins are preferred as component (A).

The essential components of the intumescent polymer derived from the composition according to the present invention are the phosphate ester containing component and the amino-formaldehyde resin. Said components are preferably employed in a weight ratio of amino-formaldehyde resin to phosphate ester of from 30:70 to 70:30, particularly from 40:60 to 50:50.

The preferred use of the composition according to the present invention is for the coating of fiberglass mats and panels, respectively, particularly of a product available under the designation Conolite® (Pioneer Plastics, Tenn., USA) which usually is employed for the lining of cargo space of aircraft and the like. An amino-formaldehyde resin component which is particularly preferred for said specific application is a liquid, water-soluble melamine-formaldehyde resin which is available under the tradename Cymel® 303 (American Cyanamid). Said product presumably contains a large proportion of hexamethoxymethylmelamine of the general formula

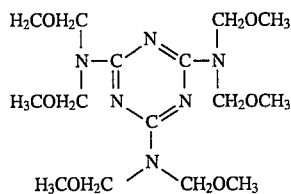

An important aspect regarding the present invention is the mixing sequence of the individual components of the present intumescent composition. It is particularly important to first combine the phosphate ester with the water scavenger and/or the remaining additives (fillers, pigments and surfactants) for the completion of component (B). Said component (B) is preferably stored separate from the amino-formaldehyde resin component (A). Preferably components (A) and (B) are combined and reacted only immediately before the production of the coating. By said separate storage undesired premature polymerisation, crosslinking and the like are avoided. Said premature polymerisation may, for example, occur when contacting the surfactants, the thixotroping agent or any other water containing compounds with the amino-formaldehyde resin, thereby reducing the shelf life of said component considerably. By proceeding in the way described above, a shelf life of the two-component system according to the present invention of half a year to one year may be achieved. When ready for use, the amino-formaldehyde resin is added to the phosphate ester containing component (B) in a clean container, preferably of glass or plastic.

Upon mixing, the phosphate ester and the amino-formaldehyde resin react with condensation to form an intumescent polymer.

It is to be understood that the composition according to the present invention, upon mixing of components (A) and (B), may be applied not only onto fiberglass mats or panels but also onto all other substrates which need protection from fire. Examples of such substrates are wood, plastics, glass fibers, rubber, metals and fabrics. The composition may be applied by conventional methods, e.g., by spraying, dipping, drawing and brushing. Also, in order to achieve a higher thickness of the layer the application may be repeated several times. The thickness of the layer obtained in a specific case will depend on the viscosity of the composition and the substrate to be coated. Conventional layer thicknesses range from 10 μm to 3 mm.

The composition according to the present invention is self curing, the curing being preferably carried out at room temperature. A temperature range of 0° to 65° C. is generally suitable for curing. Sufficiently rapid curing with the coating being dried to the touch after about two hours takes place at a temperature above about 10° C.

Coatings of various formulations are possible. A preferred formulation for the coating of Conolite® fiberglass panels is described in Example 2 below.

EXAMPLES

The following examples serve to further illustrate the present invention without, however limiting the scope thereof.

Example 1

This example illustrates a simple preparation of a mixture of partial esters of phosphoric acid.

A one liter round bottom flask equipped with anchor stirrer, a vacuum line (achievable reduced pressure 160 mm Hg or below), a heating mantle with temperature control, a dropping funnel and a powder funnel is charged with 184 g glycerol via the powder funnel. The heating is adjusted to 140° C. A total of 272 g of pentaerythritol is added to the hot, slowly stirred glycerol. At about 145° C. and under reduced pressure water is removed from the polyol mixture containing same for about 0.5 hours. After cooling to 115° C. and adjusting the temperature to be kept at this value 338 g of commerically available tetraphosphoric acid are added at high stirrer speed (about 1000 rpm) and at a rate such that the temperature inside the reactor does not exceed 115° C. After the completion of the addition of tetraphosphoric acid the reaction mixture is kept at 115° C. and under reduced pressure for a further 4 hours. The course of the reaction is monitored by determining the acid number which at the end of the reaction has dropped to a constant value of about 440 mg KOH/g.

The product obtained as above may be formulated into an aqueous solution by addition of water.

Example 2

Use of the composition according to the present invention for the coating of fiberglass panels etc.

The phosphate ester containing component (B) was prepared as follows: BUDIT® 380 (47.4 parts by weight) was mixed with 18.9 parts b.w. of water with slow stirring. Then 1.3 parts b.w. of AEROSIL® 200 (fumed silica) were added thereto in small portions with slow stirring. After a homogeneous mixture had been obtained, 2.0 parts b.w. of COLORTREND® paste were added and the mixture was stirred until homogeneous. Subsequently component (B) was placed in a sealable vessel for further use. The sequence of addition of the individual components does not have any detectable effect on the intumescent polymer prepared therefrom. Thus the fumed silica may also be added prior to the addition of water. Other sequences are possible as well.

The amino-formaldehyde component (A) consisted exclusively of CYMEL® 303, i.e., a melamine-formaldehyde resin of the liquid type which for the application may be employed either in repackaged form or retained within its original packaging. Both components may be stored for use at a later point in bulk.

The packaging may, however, also be such that both components are provided as two-component system in matched amounts. The mixing of the contents of each container will then automatically result in the proper mixing ratio. It is to be pointed out that both components (A) and (B) show a high storage stability of between 6 months and one year if stored separately. Component (B) was taken from its package and homogenized. Thereafter component (A) was added in an amount of 30.4 parts b.w., based on the total weight of the mixture. The components were subsequently mixed with stirring under medium shear. Prior to use the composition was allowed to settle for about 5 to 10 minutes.

The composition thus prepared was applied onto various substrates. A first coating was applied onto an aluminum foil of the type commonly employed for household use. A further coating was applied onto polyethylene film, also of the type conventional in the trade, and finally woven fiberglass fabric and sanded or untreated, respectively, CONOLITE® fiberglass panels were treated with said composition.

With the aluminum foil a coating which adhered to the substrate very well was obtained after a relatively short drying time of approximately 10 to 15 minutes.

The composition applied onto the woven fiberglass fabric by means of a brush until the substrate was saturated rendered the fabric somewhat stiffer during curing but after several days the fabric had regained sufficient flexibility.

After coating the polyethylene film (by means of a brush) a uniform flexible coating with good adhesion was obtained.

The CONOLITE® fiber glass panels were coated with the composition by means of both a brush and a wooden spatula. In both cases a uniform smooth surface with good adhesion was obtained. Drying to touch of these panels required approximately 30 minutes.

After about two days of storage at room temperature (about 22° C.) and low air flow the samples thus coated were tested with respect to flexibility and adhesion. The flexibility was tested by means of a bending test (90° around a mandrel having a diameter of approximately 4 cm). The samples were tested in both directions, i.e., with the coating on both the inner and the outer surface of the mandrel.

The aluminum foil did not show any cracks, breaks or tears or any peeling of the coating in these tests.

The impregnated fiberglass fabric also did not show any cracks, breaks or tears or any peeling off the substrate.

The coated polyethylene film initially showed a high flexibility without cracks or breaks. After 3 days, however, pinching or rolling quickly under pressure resulted in a breaking of the coating. Only when the tearing of the coating was induced by pinching the coating separated from the film at that time. Once the coating was fully cured it separated readily from the film.

The samples obtained according to the above method were then pasted onto a CONOLITE® fiberglass panel by means of an adhesive (Monsanto 2497) and subjected to a flame from a hand-held torch. Depending on the layer thickness of the applied coating and the substrate intumescent layers having a thickness of 8 to 16 mm resulted.

When applied onto a CONOLITE® fiberglass panel in two layers the composition according to the present invention withstood a torch flame of 925° C., with the flame impinging from below, for at least 5 minutes as prescribed by test FAA 25,855, appendix F.

The panel thus coated also passed the test for impermeability for fumes and flames. The temperature on the backside prescribed by the test, measured by means of a thermocouple at a distance of 10 cm from the panel, also was below the prescribed limit of 204° C.

What is claimed as new and is desired to be secured by letters patent of the United States is:

1. An intumescent composition of the two-component type, obtained by combining
   (A) an amino-formaldehyde resin; and
   (B) an ester of phosphoric acid in admixture with an additive selected from the group consisting of a water scavenger, a filler, a pigment, a surfactant and a mixture thereof, wherein said ester of phosphoric acid is a partial ester of phosphoric acid with one or more polyols.

2. The intumescent composition of claim 1, wherein said polyols are selected from the group consisting of aliphatic and cycloaliphatic polyols having 2 to 12 carbon atoms.

3. The intumescent composition of claim 2, wherein said polyols have 2 to 6 carbon atoms.

4. The intumescent composition of claim 2, wherein said polyols are selected from the group consisting of glycerol, trimethylolpropane, pentaerythritol, inositol, ethane diol, propane diol and a mixture thereof.

\* \* \* \* \*